June 2, 1936.  R. P. F. LIDDELL  2,042,537
FILTER AND METHOD OF MAKING SAME
Original Filed Feb. 6, 1931
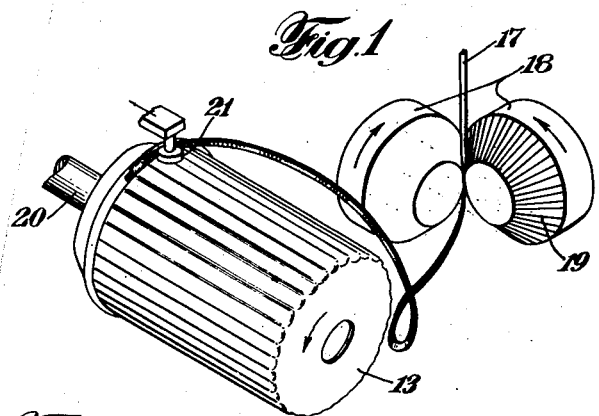
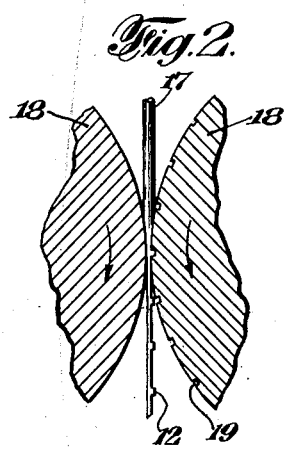
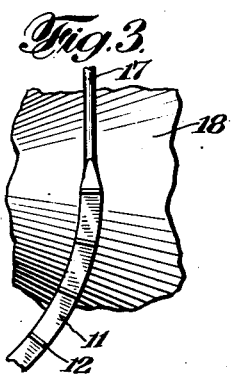
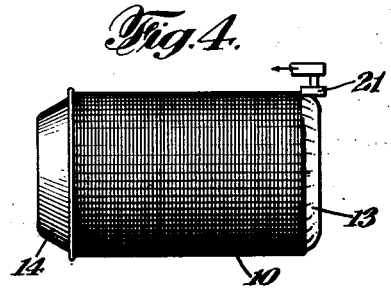
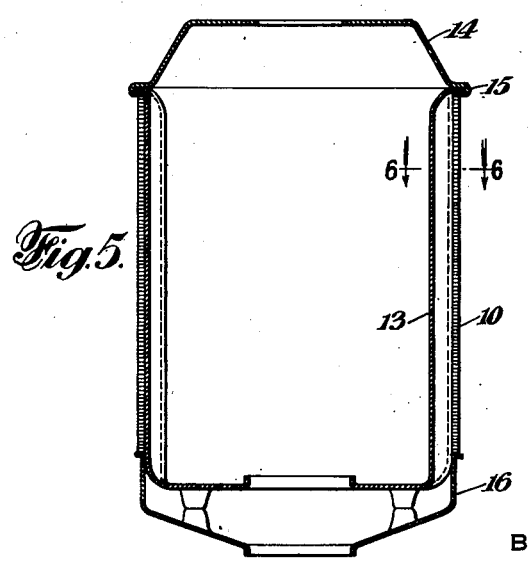
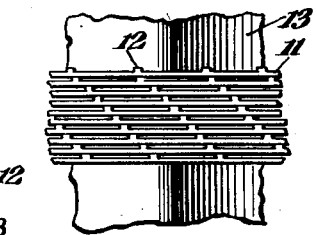
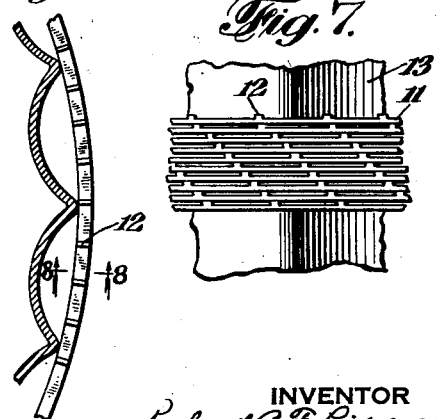
INVENTOR
Robert P. F. Liddell
BY his ATTORNEYS.
Kenyon & Kenyon Patented June 2, 1936

2,042,537

UNITED STATES PATENT OFFICE 2,042,537

FILTER AND METHOD OF MAKING SAME

Robert P. F. Liddell, Darien, Conn., assignor to Motor Improvements, Inc., Newark, N. J., a corporation of Delaware Application February 6, 1931, Serial No. 513,806
Renewed December 15, 1933

21 Claims. (Cl. 29—163.5)

This invention relates to improvements in filters and methods of manufacturing the same.

An object of this invention is to provide an inexpensive metallic filter unit of rigid construction capable of withstanding relatively high pressure and having a large area of definitely sized filtering interstices within small compass and requiring a minimum of metal in relation to the effective filtering surface and has as a further object a process of producing such filters rapidly, efficiently and inexpensively.

A filter unit embodying the invention consists of a slotted metal cylinder composed of a helix of metal ribbon of minute thickness having its wide faces normal to the axis of the helix, and means to space the turns of the helix to provide filtering slots, spacing means preferably consisting of projections of predetermined height extending from one face of the ribbon. The ribbon is preformed with definite uniform curvature, whereby without any deforming or straining, it naturally assumes helical shape with its wide faces transverse to the axis of the helix and with the turns of the helix spaced apart at a known distance by the said projections. The turns of the ribbon are definitely spaced to provide a succession of apertures or slots which are of uniform predetermined gauge or filtering width, exactly corresponding to the height of the projections and which may be so extremely narrow as to make the filter unit effective to remove from fluid passing through it all but the most minute particles. Due to the extreme thinness of the ribbon, the total area of the apertures or slots, i. e. the effective filtering area, forms a much larger proportion of the total area of the filter element than in previously known filters of rigid construction and therefore fluid to be filtered may be passed through the filter unit at a relatively high rate.

Although the metal ribbon is uniformly curved or shaped so that it may easily be wound on edge in the form of a helix without any deforming or straining, yet it is so thin that it is not self-aligning, but requires means to align it and maintain it in helical form. Preferably, the ribbon is wound on edge around a drum or other hollow support, having provision to conduct fluid toward or away from the inner face of the cylinder thus formed. The drum or other support aligns the turns of the ribbon and also supports and reinforces the complete cylinder. The fluid to be filtered may be passed from the outside inwardly or from the inside outwardly between the turns of the helix, but the former arrangement is preferable as it facilitates cleaning of the filter unit.

The metal ribbon preferably is formed so that it tapers in the direction in which the fluid is to flow through the cylinder thereby providing apertures with somewhat diverging walls. Impurities are thus prevented from wedging between the adjacent turns of the ribbon and minute particles of less diameter than the distance between the turns of the helix at the entering edge of the slot are flushed through and clogging of the filtering unit is avoided. I also preferably form the narrow face of the ribbon on the entering side of rounded contour to aid in cleaning and removal of the filter cake as hereinafter described.

A ribbon of definite curvature may be obtained from a straight round wire according to my invention by passing the wire between cooperating conical rollers, one of the rollers having provision for forming the spacing projections or transverse ribs. The rollers not only convert the round wire into a thin flat ribbon, but give to it the definite predetermined curvature and shape which causes the ribbon to tend to assume the form of a helix with its wide faces in abutting relationship. Preferably, the ribbon is supplied to a drum or mandrel which is rotated and moves axially as the ribbon is wound thereon and the operation is continued until a slotted cylinder of the desired size has been formed on the drum. The cylinder may then be fixed on the drum in any suitable manner or may be transferred to and fixed on another support or the helix may be fixed by longitudinal soldering strips or the like and the slotted cylinder thus supported constitutes a sturdy, serviceable and highly efficient filter unit.

Other objects, novel features and advantages of the invention will be apparent from the following specification and accompanying drawing, wherein:

Fig. 1 is a perspective view of the rolling and winding operation;

Fig. 2 is a section through the flattening rollers;

Fig. 3 is a section substantially on the line 3—3 of Fig. 2;

Fig. 4 shows a completely wound helix on a drum;

Fig. 5 is a section through a complete filter unit;

Fig. 6 is an enlarged section on the line 6—6 of Fig. 5;

Fig. 7 is an enlarged partial elevation, and

Fig. 8 is a fragmentary enlarged section on line 8—8 of Fig. 6.

Referring now to the illustrative form of my invention shown more especially in Figs. 5 to 8 inclusive, the filter unit comprises a slotted cylinder 10, formed from a flat metal ribbon 11 of minute thickness and which is provided on one face with spaced transverse ribs 12 which extend a similar distance outwardly from said face of the ribbon, which distance is suited to the purpose for which the filter is to be used, so that the resulting apertures or slots are definitely sized to permit the desired flow and remove all particles of greater dimension than the height of the ribs. Instead of having ribs extending all the way across one face of the ribbon, projections or spacing means of uniform height may, of course, be substituted. Preferably the ribbon 11 is somewhat tapering in cross section in the direction radial of the cylinder with the thicker edge of the ribbon so arranged that the aperture is narrower where the dirty fluid enters (Fig. 8). In such construction, the filtering slots diverge in the direction of flow, thereby preventing wedging and clogging of impurities between the turns of the helix; and the height of the transverse ribs preferably increases in the direction, transverse of the ribbon, in which thickness of the ribbon decreases, with the result that the distance from the top of the ribs to the opposite face of the ribbon is substantially constant throughout the width of the ribbon, and although the ribbon tapers transversely it is supported throughout its width from the opposed face of the adjacent turn of the ribbon and the minimum dimension of the apertures between the turns is determined by the height of the rib at the thickest part of the ribbon. The outer edge 22 of the ribbon may be transversely curved as clearly shown in Fig. 8, thereby facilitating the removal of filter cake from the outer surface of the cylinder by reverse flow of fluid through the slots.

In the case of filters for lubricating oil of an internal combustion engine, the ribs 12 preferably should be upwards of one thousandth of an inch in height and not more than three thousandths, in order to remove the harmful abrasives and still allow the substantially clean oil to flow through the filter unit at such rate that the filter will be of practical utility.

The dimensions of the ribbon are such as to provide a cylinder having strength to withstand the pressure and the service to which it is to be subjected. For illustration, where the ribs are from one to two thousandths of an inch high and the filter is to be subjected to pressures not to exceed one hundred pounds per square inch, I have found that a metal ribbon may be used having an average thickness of six thousandths (.006) of an inch in a direction parallel to the axis of the cylinder or helix and a width thirty-five thousandths (.035) inch in the direction radially of the cylinder.

It is impossible to closely wind a straight ribbon of these dimensions on edge in helical form without such buckling or bending of the ribbon as to interfere with and prevent uniform spacing between the turns. Therefore, in prior metal filters it has been thought necessary, for purposes of uniform winding and construction, to make the thickness and size of the ribbon so great as to prevent buckling or tipping of the successive turns; and this width of ribbon, which has heretofore been considered a manufacturing requisite, so reduces the ratio of effective filtering area to total size of filtering element as to seriously impair the utility of the completed device. By my invention, I avoid this defect by forming a very thin ribbon but preshaping it with definite uniform curvature so that it naturally tends to assume helical shape with its faces in contact and transverse to the axis of the helix.

Furthermore, a cylinder having the large ratio of effective filtering area to total area of filtering element contemplated by my invention will be at least one hundred times in diameter the thickness of the ribbon (in direction parallel to the axis of the cylinder) and in such arrangement the ribbon has insufficient rigidity to hold the successive turns of the helix in alignment without the aid of some aligning or supporting means. In the illustrative embodiment of my invention disclosed herein, a fluted drum 13 is utilized as the aligning and supporting means for the filter unit 10. This drum comprises a main cup-shaped portion to the rim of which is attached a cover 14 in such manner as to provide a flange 15, against one end of which the cylinder 10 abuts. The lower end of the cylinder terminates slightly short of the bottom end of the drum. A cap 16 fits over the lower end of the drum and engages the lower end of the cylinder 10, the cap being attached to the drum in any suitable manner. The flutes in the drum form channels communicating with the header formed by the bottom of the cup-shaped member and the cap 16. The edges of the flutes contact with the cylinder along lines parallel to or equi-distant from the axis thereof with the result that there is provided a rigid cylinder having a multiplicity of uniformly sized filtering interstices. Such structure combines strength with light weight and high percentage of effective filtering area in relation to the size of the filter unit.

As illustrated in Fig. 1, the above described filtering unit may be produced by first converting a round wire into a thin flat ribbon having a definite uniform curvature such that it tends naturally to form a helix of the diameter of the fluted drum and arranging such ribbon around the fluted drum 13. The round wire 17 is converted into the above described flat ribbon 11 by feeding the wire between a pair of conical rollers 18 having their axes of rotation at right angles to each other and the slope of the cones being substantially 45°. Preferably, one of the rollers is provided with spaced radial grooves 19 so that transverse ribs 12 are formed projecting from one face of the ribbon. The drum 13 is supported upon a shaft 20 uniformly rotated at a predetermined speed by means not shown and being so mounted as to be capable of movement longitudinally of its axis. The end of the ribbon is passed between a fixed guide roller 21 and the flange 15 and is attached to the flange in any suitable manner as by soldering or the like. The rollers and shaft are then rotated at predetermined relative speed and the ribbon is laid upon the drum in turns between the guide roller 20 and flange 15 to form a helix, the drum being caused to move axially by the successive turns of the ribbon as they are laid in place. The rolling and winding operations are continued until a slotted cylinder of the desired size is formed on the drum, after which the ribbon is severed and the free end is soldered to the adjacent turn. The cap 16 is then fitted over the end of the drum and attached thereto. The drum constitutes supporting and aligning means for the helix and the ridges of the flutes engage the edges of the ribbon which is arched between them, so that a structure is achieved which is capable of withstanding high pressures.

The flutes provide channels for leading fluid to or away from the inner face of the cylinder. The transverse curvature of the outer edge of the ribbon facilitates removal of filter cake from the outer face of the cylinder by reverse flow of filtered fluid through the slots. The curved surface thus provided adjacent the outer edges of these slots enables the reversely flowing fluid to work in between the cylinder and filter cake to loosen the latter and thus reduce its adhesion to the cylinder.

Obviously, buckling or bending of the ribbon out of the normal plane of its width must be avoided in the finished filter, as it would prevent the transverse ribs 12 from determining the distance between the opposed wider faces of successive turns of the helix and would destroy the uniformity of the width of the filtering interstices between the turns of the helix. As heretofore pointed out, the ribbon of which the helix is formed has such width relative to its thickness that a bending of the ribbon in the plane of its width will cause the ribbon to buckle out of the normal plane of its width; and accordingly precautions are taken during formation of the filter after the ribbon is formed, by setting of the metal, with the desired curvature in the normal plane of its width, to avoid such buckling as would permanently deform the metal. Thus, as clearly indicated in Fig. 1, such bending as occurs between the conversion of the wire 11 into a thin ribbon having a definite curvature in the plane of its width by means of rollers 18 and the winding of the ribbon in the form of a helix upon the supporting drum 13, is limited to a bending which will not permanently deform the metal and which is preferably in the plane of the thickness of the ribbon (a bending transversely of the ribbon) instead of a bending of the ribbon in the normal plane of its width; and the curvature of the ribbon in the normal plane of its width, imparted thereto by a setting of the metal, is such that the winding of the ribbon on edge upon its support does not cause such bending of the ribbon in the plane of its width as will cause a buckling of the ribbon.

The structure above described combines the qualities of uniformly fine edge filtration, great structural strength and a high degree of filtering efficiency, that is, a high ratio of effective filtering area to the total area of the filtering unit. The strength and uniformity of filtering qualities of tube filters are herein combined with the high filtering efficiency of a wire screen. The edgewise arrangement of the ribbon on the support combined with the lateral support given to each turn by the adjacent turn through the spaced ribs results in a very strong and rigid construction capable of withstanding pressures entirely outside the range of possibility of wire screens of corresponding filtering fineness and yet having a filtering efficiency comparable with that of wire screens. The efficiency of edge filters is combined with structural strength sufficient to withstand high pressures in an inexpensive and light device which is economical to manufacture and of extreme durability.

While many modifications in form and arrangement may be made without departing from the spirit of the invention, it is apparent that the above described filtering unit combines the well-known advantages of edge filtration with absolutely uniform predetermined width of the filtering apertures or slots so that rigid construction is effected and the aggregate area of the apertures or slots is large in relation to the total area of the unit and a very great saving in material is effected over other metal filters in relation to the filtering capacity provided.

By the term "helix" as used in the foregoing description and in the appended claims, it is intended to include elements which are substantially cylindrical in form, such for example, as truncated cones and similar shapes.

I claim:

1. In a method for forming a filter unit comprising a continuous element in the form of a helix which has filtering interstices between adjacent turns of the helix and which is carried by a support; the steps comprising rolling a wire into a transversely ribbed ribbon of which the width bears such relation to the thickness thereof that substantial bending of the ribbon in the normal plane of the width thereof buckles the ribbon out of that plane; forming the ribbon, by setting of the metal thereof, with such definite and uniform curvature in the normal plane of the width of the ribbon that the ribbon may be put without buckling of the ribbon out of the normal plane of the width thereof into the form of a helix comprising a multiplicity of turns with the width of the ribbon lying substantially normal to the axis of the helix and with the wider faces of the ribbon in opposed relation; and winding the preformed ribbon on edge and in the form of such helix around a support of such diameter that substantial bending of the ribbon in the plane of its width in avoided and with the successive turns of the helix spaced by the transverse ribs, and thereby forming a filter element comprising a cylinder having filtering interstices of definite dimension.

2. In a method for forming a filter unit comprising a continuous element in the form of a helix which has filtering interstices between adjacent turns of the helix and which is carried by a support; the steps comprising rolling a wire into a transversely ribbed ribbon of which the width bears such relation to the thickness thereof that substantial bending of the ribbon in the normal plane of the width thereof buckles the ribbon out of that plane; forming the ribbon, by setting of the metal thereof, with such definite and uniform curvature in the normal plane of the width of the ribbon that the ribbon may be put upon the support without buckling of the ribbon out of the normal plane of the width thereof into the form of a helix comprising a multiplicity of turns with the width of the ribbon lying substantially normal to the axis of the helix and with the wider faces of the ribbon in opposed relation; and winding the preformed ribbon helically on edge around the support with the successive turns of the helix spaced by the transverse ribs, and thereby forming a filter element comprising a cylinder having filtering interstices of definite dimension.

3. In a method for forming a filter unit comprising a continuous element in the form of a helix which has filtering interstices between adjacent turns of the helix and which is carried by a support; the steps comprising rolling a wire into a ribbon of which the width bears such relation to the thickness thereof that bending of the ribbon in the normal plane of the width thereof buckles the ribbon out of that plane; forming the ribbon by, setting of the metal thereof, with such definite and uniform curvature in the normal plane of the width of the ribbon that the ribbon may be put without buckling of the ribbon out of the normal plane of the width thereof into the form of a helix comprising a multiplicity of turns with the width of the ribbon lying substantially normal to the axis of the helix and with the wider faces of the ribbon in opposed relation; and winding the preformed ribbon on edge around said support and in the form of such helix without substantial bending of the ribbon in the plane of its width and with the successive turns of the helix in definitely spaced relation, and thereby forming a filter element comprising a cylinder having filtering interstices of definite dimension.

4. In a method for forming a filter unit comprising a continuous element in the form of a helix which has filtering interstices between adjacent turns of the helix and which is carried by a support; the steps comprising rolling a wire into a ribbon of which the width bears such relation to the thickness thereof that bending of the ribbon in the normal plane of the width thereof buckles the ribbon out of that plane; forming the ribbon, by setting of the metal thereof, with such definite and uniform curvature in the normal plane of the width of the ribbon that the ribbon may be put without buckling of the ribbon out of the normal plane of the width thereof into the form of a helix comprising a multiplicity of turns with the width of the ribbon lying substantially normal to the axis of the helix and with the wider faces of the ribbon in opposed relation, the diameter of the turns of the helix bearing such relation to the cross-sectional area of the ribbon that the weight of the turns will distort the ribbon and misalign the turns of the helix; and winding the ribbon on edge in the form of a helix around a support of such diameter that substantial bending of the ribbon in the plane of its width is avoided and with the successive turns of the helix in definitely spaced relation and having their edges aligned by said support, and thereby forming a rigid, metal filter element comprising a cylinder highly resistant to pressure and having fine filtering interstices constituting a high per cent. of the total area of the cylinder.

5. In a method for forming a filtering unit comprising a continuous element in the form of a helix which has filtering interstices between adjacent turns of the helix and which is adapted to be associated with parts for presenting liquid to be filtered to one surface of the unit and for conducting liquid from the other surface thereof; the steps comprising rolling a wire into a ribbon of which the width bears such relation to the thickness thereof that bending of the ribbon in the normal plane of the width thereof buckles the ribbon out of that plane; forming the ribbon, by setting of the metal thereof, with such definite and uniform curvature in the normal plane of the width of the ribbon that the ribbon may be put without buckling of the ribbon out of the normal plane of the width thereof into the form of a helix comprising a multiplicity of turns with the width of the ribbon lying substantially normal to the axis of the helix and with the wider faces of the ribbon in opposed relation; winding the preformed ribbon on edge and in the form of a helix upon a support having an annular series of spaced straight edges, without substantial bending of the ribbon in the plane of its width, and with the successive turns of the ribbon in spaced relation in a direction parallel to the axis of the helix; and compressing, in a direction parallel to the axis of the helix, the turns of the ribbon supported on said straight edges; and thereby forming a substantially cylindrical filtering element having filtering interstices between successive turns of the ribbon.

6. In a method for forming a filtering unit comprising a continuous element in the form of a helix which has filtering interstices between adjacent turns of the helix and which is adapted to be associated with parts for presenting liquid to be filtered to one surface of the unit and for conducting liquid from the other surface thereof; the steps comprising rolling a wire into a ribbon of which the width bears such relation to the thickness thereof that bending of the ribbon in the normal plane of the width thereof buckles the ribbon out of that plane; forming the ribbon, by setting of the metal thereof, with such definite and uniform curvature in the normal plane of the width of the ribbon that the ribbon may be put without buckling of the ribbon out of the normal plane of the width thereof into the form of a helix comprising a multiplicity of turns with the width of the ribbon lying substantially normal to the axis of the helix and with the wider faces of the ribbon in opposed relation; and winding the preformed ribbon in the form of such helix, without substantial bending of the ribbon in the plane of its width, and with the width of the ribbon lying substantially normal to the axis of the helix, and with the successive turns of the helix substantially in alinement and in spaced relation in a direction parallel to the axis of the helix; and thereby forming a substantially cylindrical filtering element having filtering interstices between successive turns of the ribbon.

7. In a method for forming a filtering unit comprising a continuous element in the form of a helix which has filtering interstices between adjacent turns of the helix and which is adapted to be associated with parts for presenting liquid to be filtered to one surface of the unit and for conducting liquid from the other surface thereof; the steps comprising rolling a wire into a ribbon of which the width bears such relation to the thickness thereof that bending of the ribbon in the normal plane of the width thereof buckles the ribbon out of that plane, and simultaneously forming the ribbon, by setting of the metal thereof, with such definite and uniform curvature in the normal plane of the width of the ribbon that the ribbon may be put without buckling of the ribbon out of the normal plane of the width thereof into the form of a helix comprising a multiplicity of turns with the width of the ribbon lying substantially normal to the axis of the helix and with the wider faces of the ribbon in opposed relation; and winding the preformed ribbon in the form of such helix, without substantial bending of the ribbon in the plane of its width, and with the width of the ribbon lying substantially normal to the axis of the helix, and with the successive turns of the helix substantially in alinement and in spaced relation in a direction parallel to the axis of the helix; and thereby forming a substantially cylindrical filtering element having filtering interstices between successive turns of the ribbon.

8. In a method for forming a filter unit comprising a continuous element in the form of a helix which has filtering interstices between adjacent turns of the helix and which is adapted to be supported for the presentation of liquid to be filtered to one face thereof and for withdrawal of filtered liquid from the other face thereof; the steps comprising rolling a wire into a transversely tapered and transversely ribbed ribbon of which the width bears such relation to the thickness thereof that substantial bending of the ribbon in the normal plane of the width thereof buckles the ribbon out of that plane, and the height of the ribs increases in the direction in which the thickness of said ribbon decreases and the tops of the ribs are equidistant from the opposite face of the ribbon; forming the ribbon, by setting of the metal thereof, with such definite and uniform curvature in the normal plane of the width of the ribbon that the ribbon may be put without buckling of the ribbon out of the normal plane of the width thereof into the form of a helix comprising a plurality of turns with the width of the ribbon lying substantially normal to the axis of the helix and with the wider faces of the ribbon in opposed relation; and winding the preformed ribbon in the form of such helix without substantial bending of the ribbon in the plane of its width, and with the width of the ribbon lying substantially normal to the axis of the helix, and with the successive turns of the helix spaced by the transverse ribs; and thereby forming a substantially cylindrical filter element having filtering interstices of definite dimension.

9. In a method for forming a filter unit comprising a continuous element in the form of a helix which has filtering interstices between adjacent turns of the helix and which is adapted to be supported for the presentation of liquid to be filtered to one face thereof and for withdrawal of filtered liquid from the other face thereof; the steps comprising rolling a wire into a ribbon of which the width bears such relation to the thickness thereof that bending of the ribbon in the normal plane of the width thereof buckles the ribbon out of that plane; forming the ribbon, by setting of the metal thereof, with surface-projections in one of its wider faces and with such definite and uniform curvature in the normal plane of the width of the ribbon that the ribbon may be put without buckling of the ribbon out of the normal plane of the width thereof into the form of a helix comprising a multiplicity of turns with the width of the ribbon lying substantially normal to the axis of the helix and with the wider faces of the ribbon in opposed relation; and winding the preformed ribbon in the form of such helix without substantial bending of the ribbon in the plane of its width, and with the width of the ribbon lying substantially normal to the axis of the helix, and with the wider faces of the ribbon in opposed relation and spaced by said surface-projections; and thereby forming a substantially cylindrical filtering element having filtering interstices between successive turns of the ribbon.

10. In a method for forming a filter unit comprising a continuous element in the form of a helix which has filtering interstices between adjacent turns of the helix and which is adapted to be supported for the presentation of liquid to be filtered to one face thereof and for withdrawal of filtered liquid from the other face thereof; the steps comprising rolling a wire into a ribbon of which the width bears such relation to the thickness thereof that bending of the ribbon in the normal plane of the width thereof buckles the ribbon out of that plane; by rolling between conical rollers of which one is provided with depressions in its face, forming the ribbon, by setting of the metal thereof, with surface-projections upon one wider face thereof and with such definite and uniform curvature in the normal plane of the width of the ribbon that the ribbon may be put without buckling of the ribbon out of the normal plane of the width thereof into the form of a helix comprising a multiplicity of turns with the width of the ribbon lying normal to the axis of the helix and with the wider faces of the ribbon in opposed relation; and winding the preformed ribbon in the form of such helix without substantial bending of the ribbon in the plane of its width and with the wider faces of successive turns of the helix in opposed relation and spaced by said projections; and thereby forming a substantially cylindrical filtering element having filtering interstices between successive turns of the ribbon forming the same.

11. In a filter, a supporting member having longitudinal depressions, a filtering unit surrounding said supporting member and forming with the depressions a plurality of channels open at one end of the supporting member, and a cap having a flange receiving said end of the supporting member and forming a header therewith into which said channels discharge.

12. In a filter, a fluted drum, a cylindrical filtering unit contacting with the ridges of said drum and forming with the depressions thereof a plurality of channels open at one end of the drum, and a cap having a flange receiving said end of the drum and forming a header therewith into which said channels discharge.

13. In a filter, a fluted metal drum, a slotted metal cylinder contacting with the ridges of said drum and forming with the depressions thereof a plurality of channels open at one end of the drum, and a cap having a flange receiving said end of the drum and forming a header therewith into which said channels discharge.

14. In a filter, a fluted metal drum, a cylindrical metal filtering unit contacting with the ridges of the drum and forming with the depressions thereof channels open at one end of the drum, said cylinder comprising a helix composed of thin narrow metal ribbon with its width substantially normal to the axis of the helix, means for uniformly spacing the turns of the helix to provide filtering interstices, and a cap having a flange receiving said end of the drum and forming a header therewith into which said channels discharge.

15. In a filter, a fluted drum, a cylindrical filtering unit surrounding said drum and forming therewith channels open at one end of the drum, a cap fitted over said end of the drum and forming therewith a reservoir into which said channels discharge, and an outlet from said reservoir at a higher level than the open ends of said channels whereby the latter are sealed with liquid.

16. A filtering unit comprising a helix composed of metal ribbon so thin as to be incapable of being wound on edge in helical form without buckling, said ribbon being preformed with definite uniform curvature whereby it naturally assumes helical form with its width substantially normal to the axis of the helix, the ribbon being tapered in cross section and being of such minute cross-sectional area in relation to the diameter of the helix as to be substantially incapable of maintaining the successive turns of the helix in alignment without additional support, spaced projections on a face of the ribbon to provide interstices of definite width between the adjacent turns of the helix, and the height of said projections increasing in the direction, transverse of the ribbon, in which the thickness of the ribbon decreases and the distance from the tops of said projections to the opposite face of the ribbon being constant, and means for supporting and aligning the turns of the helix.

17. A filter unit comprising a helix of metal ribbon having narrow edges and relatively wide faces, the ribbon lying with its width substantially normal to the axis of the helix and the thickness of the ribbon bearing such relation to the width thereof that bending of the ribbon in the plane of the width thereof buckles the ribbon out of that plane, the ribbon being tapered in a direction normal to the axis of the helix and one wide face of the ribbon being provided with projections of which the tops are equidistant from the opposite face of the ribbon, said projections providing interstices of definite width between adjacent turns of the helix.

18. A filter unit comprising a helix of metal ribbon having narrow edges and relatively wide faces, the ribbon lying with its width substantially normal to the axis of the helix and the thickness of the ribbon bearing such relation to the width thereof that bending of the ribbon in the plane of the width thereof buckles the ribbon out of that plane, one wide face of the ribbon lying at an acute angle to a plane normal to the axis of the helix and said wide face being provided with projections of which the tops lie in a plane normal to the axis of the helix, said projections providing interstices of definite width between adjacent turns of the ribbon.

19. A filter unit comprising a helix of metal ribbon having narrow edges and relatively wide faces, the ribbon lying with its width substantially normal to the axis of the helix and with wide faces of successive turns of the ribbon in opposed relation, the ribbon being tapered in a direction normal to the axis of the helix and one wide face of the ribbon being provided with projections of which the tops are equidistant from the opposite face of the ribbon, said projections engaging the opposed wide face of the ribbon of the next adjacent turn of the ribbon and providing interstices of definite width between adjacent turns of the helix.

20. The method according to claim 1 wherein the rolling and forming steps are simultaneously effected.

21. The method according to claim 3, wherein the rolling and forming steps are simultaneously effected.

ROBERT P. F. LIDDELL.